US009905086B1

(12) United States Patent
Phillips et al.

(10) Patent No.: US 9,905,086 B1
(45) Date of Patent: Feb. 27, 2018

(54) MONITORING CASH SUPPLY-RELATED INFORMATION AND MANAGING REFILL OF A CASH SUPPLY

(71) Applicant: Capital One Services, LLC, McLean, VA (US)

(72) Inventors: Jeremy Phillips, Brooklyn, NY (US); Zhe Liu, McLean, VA (US); Daniel Gomez Seidel, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/792,668

(22) Filed: Oct. 24, 2017

(51) Int. Cl.
*G06Q 40/00* (2012.01)
*G07F 19/00* (2006.01)

(52) U.S. Cl.
CPC .......... *G07F 19/209* (2013.01); *G07F 19/202* (2013.01); *G07F 19/203* (2013.01); *G07F 19/206* (2013.01)

(58) Field of Classification Search
CPC ............... G06Q 20/1085; G06Q 20/18; G07D 11/0066; G07D 11/0009; G07D 11/0072; H02J 50/10
USPC ........................................ 235/379; 902/9, 14
See application file for complete search history.

(56) References Cited

U.S. PATENT DOCUMENTS 5,900,607 A * 5/1999 Awatsu .............. G06Q 20/1085 235/375
7,537,153 B2 5/2009 Hurwitz et al.
D651,237 S 12/2011 Mullen et al.
D651,238 S 12/2011 Mullen et al.
D651,644 S 1/2012 Mullen et al.
D652,075 S 1/2012 Mullen et al.
D652,076 S 1/2012 Mullen et al.
D652,448 S 1/2012 Mullen et al.
D652,449 S 1/2012 Mullen et al.
D652,450 S 1/2012 Mullen et al.
D652,867 S 1/2012 Mullen et al.
D653,288 S 1/2012 Mullen et al.
8,136,723 B2 * 3/2012 Aas ......................... G07F 19/00 235/379
D665,022 S 8/2012 Mullen et al.
D665,447 S 8/2012 Mullen et al.
D666,241 S 8/2012 Mullen et al.
D670,329 S 11/2012 Mullen et al.
D670,330 S 11/2012 Mullen et al.
D670,331 S 11/2012 Mullen et al.
D670,332 S 11/2012 Mullen et al.
(Continued)

*Primary Examiner* — Seung Lee
(74) *Attorney, Agent, or Firm* — Harrity & Harrity, LLP

(57) ABSTRACT

A device may determine that a cash supply associated with an automated teller machine (ATM) device needs to be refilled. The device may provide, to user devices, a notification requesting cash to refill the cash supply. The device may receive, from each of one or more user devices of the user devices, a response to the notification. The response, from a user device of the one or more user devices, may include information identifying a capability of an individual, associated with the user device, to: provide an amount of cash to refill the cash supply, provide the cash during a time period, or provide particular denominations of cash. The device may select at least one individual to refill the cash supply with the cash. The device may provide another notification related to refilling the cash supply to notify whether the individual has been selected to refill the cash supply.

20 Claims, 5 Drawing Sheets

(56) References Cited

U.S. PATENT DOCUMENTS

| | | | |
|---|---|---|---|
| D670,759 | S | 11/2012 | Mullen et al. |
| D672,389 | S | 12/2012 | Mullen et al. |
| D673,606 | S | 1/2013 | Mullen et al. |
| D674,013 | S | 1/2013 | Mullen et al. |
| D675,256 | S | 1/2013 | Mullen et al. |
| D676,487 | S | 2/2013 | Mullen et al. |
| D676,904 | S | 2/2013 | Mullen et al. |
| D687,094 | S | 7/2013 | Mullen et al. |
| D687,095 | S | 7/2013 | Mullen et al. |
| D687,487 | S | 8/2013 | Mullen et al. |
| D687,488 | S | 8/2013 | Mullen et al. |
| D687,489 | S | 8/2013 | Mullen et al. |
| D687,490 | S | 8/2013 | Mullen et al. |
| D687,887 | S | 8/2013 | Mullen et al. |
| D688,744 | S | 8/2013 | Mullen et al. |
| D692,053 | S | 10/2013 | Mullen et al. |
| 9,311,671 | B2 * | 4/2016 | Folk ........................ G06Q 20/10 |
| 2014/0172447 | A1 * | 6/2014 | Hardy ................. G06F 19/3462 705/2 |
| 2014/0339301 | A1 * | 11/2014 | Angus .................... G06Q 40/04 235/379 |

* cited by examiner

MONITORING CASH SUPPLY-RELATED INFORMATION AND MANAGING REFILL OF A CASH SUPPLY

BACKGROUND

An automated teller machine (ATM) device may include an electronic machine that enables a customer of a financial institution to perform a financial transaction. For example, a financial transaction may include a cash withdrawal, a money deposit, a money transfer, and/or the like. An ATM device may permit performance of a financial transaction without the need for a human cashier or bank teller. In some cases, an ATM device may identify a customer of the ATM device by reading a magnetic strip and/or a chip associated with a transaction card associated with the customer.

SUMMARY

According to some possible implementations, a device may include one or more memories, and one or more processors, communicatively coupled to the one or more memories, to determine that a cash supply associated with an automated teller machine (ATM) device needs to be refilled. The one or more processors may provide, to a plurality of user devices, a notification related to refilling the cash supply. The notification may identify a need for the cash supply to be refilled. The notification may include information related to the need for the cash supply to be refilled. The notification may include information identifying one or more incentives related to the need for the cash supply to be refilled. The one or more processors may receive, from each of one or more user devices of the plurality of user devices, a response to the notification. The response, from a user device of the one or more user devices, may include information identifying a capability of an individual, associated with the user device, to provide cash to refill the cash supply. The response may include information related to at least one of: the individual, the user device, or an account associated with the individual. The one or more processors may select, based on the response from each of the one or more user devices, at least one individual to refill the cash supply with the cash. The one or more processors may provide, to each of the one or more user devices, another notification related to refilling the cash supply. The other notification, for the user device, may indicate whether the individual has been selected to refill the cash supply.

According to some possible implementations, a non-transitory computer-readable medium may store one or more instructions that, when executed by one or more processors, cause the one or more processors to determine that a cash supply associated with an automated teller machine (ATM) device needs to be refilled. The one or more instructions, when executed by the one or more processors, may cause the one or more processors to provide, to a plurality of user devices, a notification requesting cash to refill the cash supply. The notification may include information related to a need for the cash supply to be refilled. The one or more instructions, when executed by the one or more processors, may cause the one or more processors to receive, from each of one or more user devices of the plurality of user devices, a response to the notification. The response, from a user device of the one or more user devices, may include information identifying a capability of an individual, associated with the user device, to: provide an amount of cash to refill the cash supply, provide the cash during a time period, or provide particular denominations of cash. The one or more instructions, when executed by the one or more processors, may cause the one or more processors to select, based on the response from each of the one or more user devices, at least one individual to refill the cash supply with the cash. The one or more instructions, when executed by the one or more processors, may cause the one or more processors to provide, to each of the one or more user devices, another notification related to refilling the cash supply. The other notification, for the user device, may be related to notifying the individual whether the individual has been selected to refill the cash supply.

According to some possible implementations, a method may include determining, by a device, that a cash supply associated with an automated teller machine (ATM) device needs to be refilled. The method may include providing, by the device and to a plurality of user devices, a notification related to refilling the cash supply. The notification may identify a need for the cash supply to be refilled. The notification may include information identifying one or more incentives related to the need for the cash supply to be refilled. The method may include receiving, by the device and from each of one or more user devices of the plurality of user devices, a response to the notification. The response, from a user device of the one or more user devices, may include information identifying a capability of an individual to provide cash to refill the cash supply. The individual may be associated with the user device. The method may include processing, by the device, the response from the user device to identify the capability of the individual to provide the cash to refill the cash supply. The method may include selecting, by the device and based on the response from the user device, the individual to refill the cash supply with the cash. The method may include providing, by the device and to the user device, another notification related to refilling the cash supply. The other notification, for the user device, may indicate that the individual has been selected to refill the cash supply.

DETAILED DESCRIPTION

The following detailed description of example implementations refers to the accompanying drawings. The same reference numbers in different drawings may identify the same or similar elements.

An automated teller machine (ATM) device may store a limited amount of cash in a cash supply associated with the ATM device. For example, the ATM device may use the cash in the cash supply to provide cash to a user of the ATM device in association with a cash withdrawal. If the cash supply becomes empty, an individual may have to travel through a geographic area to identify another ATM device that has cash. This consumes time of the individual and/or resources of a vehicle, such as fuel resources, when the individual has to travel throughout a geographic area to identify another ATM device to use. In addition, this consumes processing resources of the ATM device when the ATM device provides a notification for display indicating that a cash supply associated with the ATM device does not have cash.

Some implementations, described herein, provide an ATM recommendation platform that is capable of receiving information related to cash in a cash supply associated with an ATM device and requesting a cash deposit from an individual based on the information related to the cash supply. In this way, the ATM recommendation platform may monitor an amount of cash in a cash supply associated with an ATM device and may perform an action related to preventing the cash supply from falling below a threshold amount of cash, from lacking a quantity of a denomination of cash that satisfies a threshold, from lacking a combination of denominations of cash, and/or the like. This conserves processing resources of an ATM device that would otherwise be consumed providing a notification for display that indicates that a cash supply associated with the ATM device is low on cash (e.g., an amount of cash does not satisfy a threshold), is low on a particular denomination, does not have a particular combination of denominations, and/or the like. In addition, this conserves time of an individual and/or resources of a vehicle that would otherwise be consumed when the individual has to travel throughout a geographic area to identify an ATM device associated with a cash supply that has cash, that has an amount of cash that satisfies a threshold, that has particular denominations, that has a quantity of denominations that satisfies a threshold, and/or the like.

Figure 1:
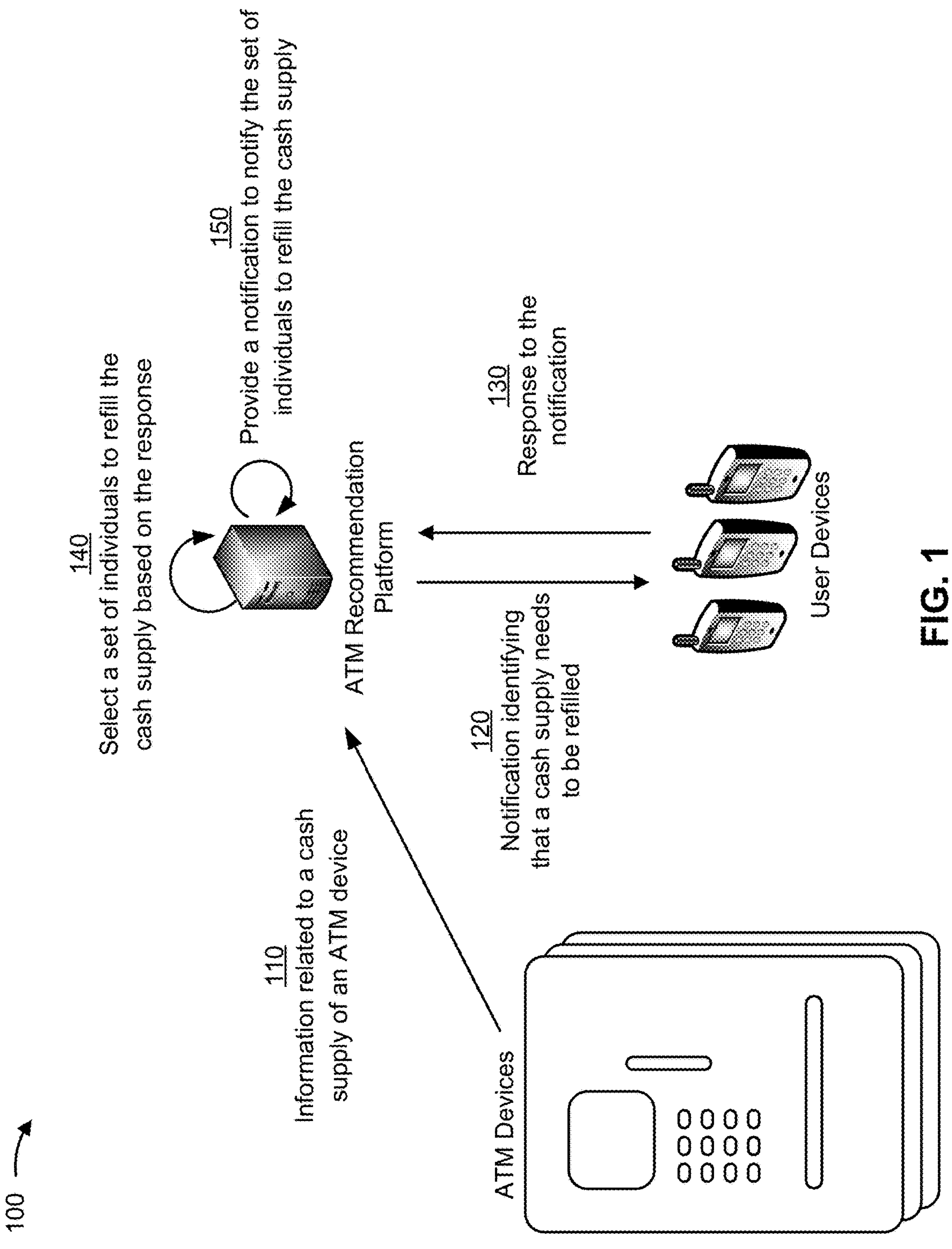
FIG. 1 is a diagram of an overview of an example implementation described herein.

FIG. 1 is a diagram of an overview of an example implementation 100 described herein. As shown in FIG. 1, implementation 100 includes multiple ATM devices, multiple user devices, and an ATM recommendation platform.

As shown by reference number 110, the ATM recommendation platform may receive, from an ATM device, information related to a cash supply of the ATM device. For example, the information may identify an amount of cash in the cash supply, a quantity of various denominations of cash in the cash supply, a demand for cash in the cash supply (e.g., an amount of cash requested in an amount of time, a quantity of various denominations requested in an amount of time, etc.), a predicted demand for cash in the cash supply (e.g., based on a past demand for cash, based on a past demand for cash during a certain time period, for example, the last 12 hours, this same time period on an earlier day, etc.), and/or the like. The ATM recommendation platform may receive information from multiple ATM devices. For example, the ATM recommendation platform may receive thousands, millions, billions, or more data elements from hundreds, thousands, or more ATM devices.

The recommendation platform may determine to request cash deposits to refill the cash supply (e.g., cash deposits from users of the user devices). The ATM recommendation platform may determine to request the cash deposits based on the information from an ATM device (e.g., based on the information identifying that an amount of cash in a cash supply of the ATM device satisfies a threshold, that a demand for cash in a cash supply satisfies a threshold, etc.). The ATM recommendation platform may monitor information for multiple ATM devices and may determine to request cash deposits to refill one or more of these ATM devices.

In some implementations, the ATM recommendation platform may determine that an ATM device needs to be refilled (e.g., in association with determining to request a cash deposit to refill the cash supply). For example, the ATM recommendation platform may determine that an ATM device needs to be refilled based on an amount of cash in a cash supply associated with the ATM device satisfying a threshold, a demand for cash in the cash supply satisfying a threshold, and/or the like.

The ATM recommendation platform may determine a score for a cash supply when determining whether the cash supply needs to be refilled. For example, the score may indicate a percentage of a capacity of a cash supply remaining or depleted, a confidence that cash in the cash supply will last a threshold amount of time, or until a particular time, and/or the like.

As shown by reference number 120, the ATM recommendation platform may provide, to the user devices, a notification identifying that a cash supply needs to be refilled. For example, the ATM recommendation platform may provide the notification to the user devices for display. The ATM recommendation platform may provide a notification to multiple sets of user devices. For example, the ATM recommendation platform may provide, to a set of user devices, a notification to refill a cash supply and may provide, to another set of devices, another notification to refill another cash supply. Continuing with the previous example, the ATM recommendation platform may select user devices to which to send a notification based on a distance between an ATM device that needs to be refilled and the user devices, an account associated with the user devices, a transaction history of users of the user devices (e.g., a cash deposit and/or cash withdrawal history to identify individuals who are likely to have cash to refill an ATM device), application usage data (e.g., current or recent usage of an application, such as a map application, a mobile banking application, etc., by an individual may indicate that the individual would be more likely than another individual to be willing to provide a cash deposit to an ATM device), and/or the like.

In some implementations, the notification may identify one or more ATM devices that need to be refilled, a location of an ATM device that needs to be refilled, an amount of cash needed to refill an ATM device, a time period during which an ATM device needs to be refilled, quantities of different denominations that are needed to refill the cash supply of an ATM device, an incentive related to refilling the cash supply of an ATM device, and/or the like.

In some implementations, a user device may receive input from a user of the user device (e.g., after providing a notification to the user device for display). For example, the input may indicate that a user of the user device is capable of refilling (partially or fully) a cash supply associated with an ATM device, may identify an amount of cash and/or denominations that the user can provide to refill the cash supply, a particular ATM device for which the user wants to refill a cash supply (e.g., when the notification identifies multiple ATM devices that need to be refilled, when a user interface associated with an application executed on the user device displays information identifying multiple ATM devices that need to be refilled, etc.), and/or the like. Additionally, or alternatively, and as another example, the input may indicate that a user of a user device does not want to provide cash to refill a cash supply.

As shown by reference number 130, a user device may provide a response to the notification from a user device. For example, a user device may provide a response based on input from a user of a user device. Additionally, or alternatively, and as another example, a user device may provide a response based on expiration of a timer (e.g., the user device may provide a response indicating that no input was received prior to the expiration of the timer). Conversely, and continuing with the previous example, the ATM recommendation platform may use a timer in a similar manner (e.g., where the ATM recommendation platform determines that a user device did not provide, or the ATM recommendation platform did not receive, a response from the user device prior to expiration of a timer).

As shown by reference number 140, the ATM recommendation platform may select a set of individuals to refill the cash supply based on the response. For example, the ATM recommendation platform may select an individual who is a user of a user device from which the ATM recommendation platform received a response indicating that the user is capable of refilling (partially or fully) a cash supply. Additionally, or alternatively, and as another example, the ATM recommendation platform may select a set of individuals based on an amount of cash that each of the set of individuals can provide (e.g., to minimize a quantity of individuals selected to provide cash). Additionally, or alternatively, and as additional examples, the ATM recommendation platform may select a set of individuals based on denominations of cash that the set of individuals can provide (e.g., particular denominations of cash may be preferred to other denominations), based on information identifying a history of an individual related to providing cash (e.g., individuals that have provided cash in the past, or that have provided cash a threshold quantity of times in the past, may be preferred to other individuals that have not provided cash, or that have provided cash less than a threshold quantity of times in the past), incentives offered to users of the user devices (e.g., the ATM recommendation platform may minimize a total amount of incentives offered to the set of individuals when different incentives are offered to different individuals), a location of an individual, a schedule of the individual, and/or the like.

The ATM recommendation platform may select different sets of individuals to refill different ATM devices. In this way, the ATM recommendation platform may manage refilling of multiple ATM devices.

As shown by reference number 150, the ATM recommendation platform may provide a notification to notify the set of individuals to refill the cash supply. For example, the ATM recommendation platform may provide the notification for display. The notification may identify an individual selected to refill a cash supply (or could indicate that the individual was not selected to refill a cash supply). Additionally, or alternatively, the notification may identify an ATM device and/or a location of the ATM device for which the individual is to refill a cash supply. Additionally, or alternatively, the notification may identify a time at which, or a period of time during which, the individual is to refill the cash supply.

The ATM recommendation platform may perform another action related to refilling a cash supply. In some implementations, the ATM recommendation platform may schedule a cash supply to be refilled by an organization whose business it is to refill cash supplies (e.g., based on an amount of cash to be provided by the set of individuals). Additionally, or alternatively, the ATM recommendation platform may generate a report (e.g., that identifies an amount of cash in a cash supply, an amount of cash to be provided to the cash supply, etc.). Additionally, or alternatively, the ATM recommendation platform may store information related to an amount of cash in a cash supply, an amount of cash provided to a cash supply, an incentive offered to a user of a user device, and/or the like (e.g., to improve prediction of demand for cash from an ATM, to improve incentives offered to holders of cash when the cash is needed to refill a cash supply, etc.).

In this way, an ATM recommendation platform may manage refill of a cash supply associated with an ATM device. This reduces or eliminates a situation where an ATM device runs out of cash, runs out of cash of a certain denomination, runs low on cash, runs low on cash of a certain denomination, and/or the like, thereby improving a customer experience of using the ATM device. In addition, this reduces downtime of an ATM device due to a cash supply of the ATM device being empty or low, thereby improving a quantity of customers that the ATM device can service. Further, this reduces a quantity of cash deliveries needed from an organization that provides cash to ATM devices, thereby reducing costs for a provider of an ATM device. Further, this facilitates an exchange between an individual and an ATM device when the ATM device needs cash, thereby facilitating a more efficient use of the cash. Further, this permits an individual to be compensated for excess cash that the individual is holding but does not need, thereby increasing a value of an account associated with the individual.

As indicated above, FIG. 1 is provided merely as an example. Other examples are possible and may differ from what was described with regard to FIG. 1.

Figure 2:
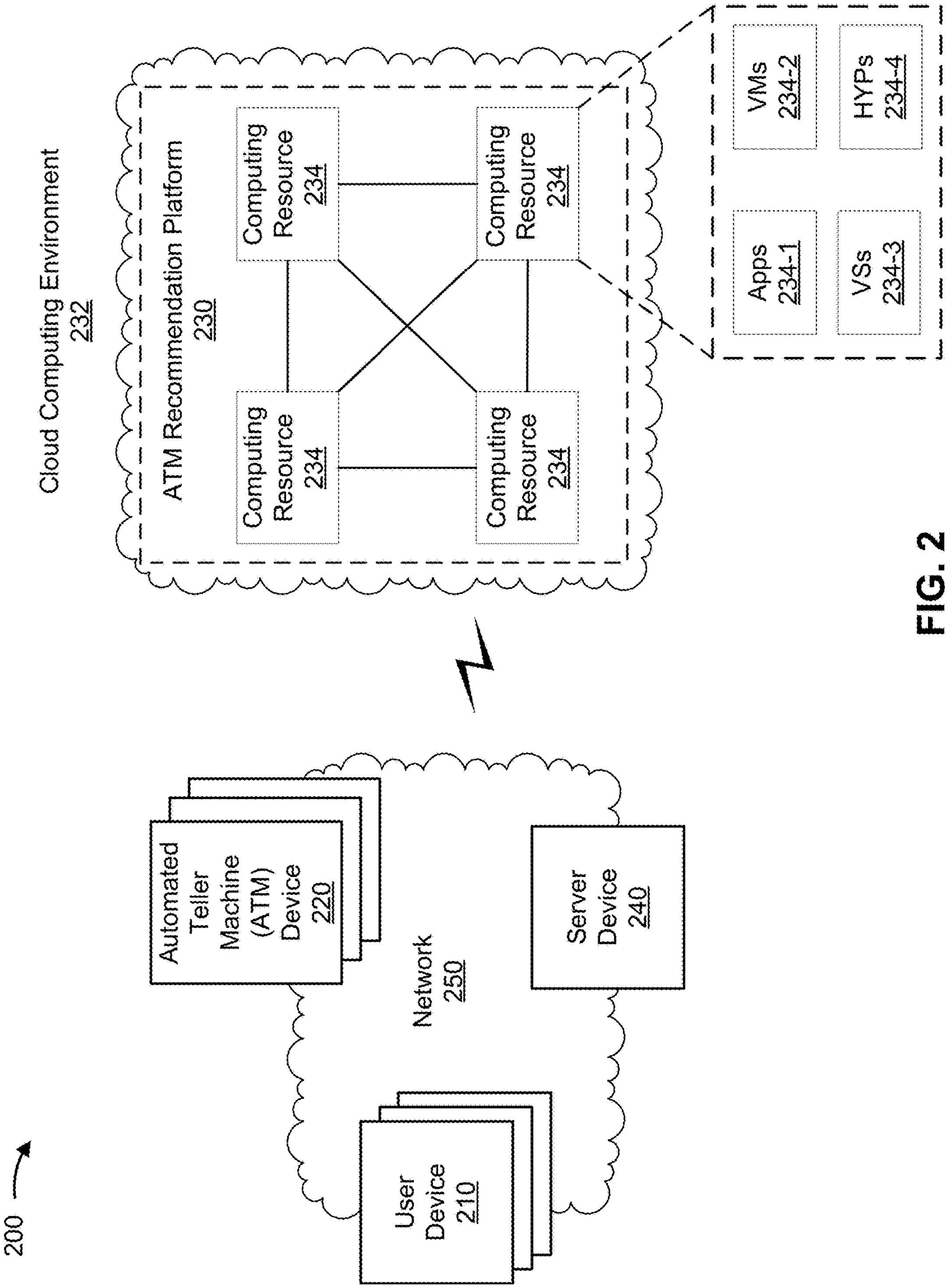
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210 (referred to collectively as "user devices 210" and individually as "user device 210"), a set of automated teller machine (ATM) devices 220 (referred to collectively as "ATM devices 220" and individually as "ATM device 220"), an ATM recommendation platform 230 provided within a cloud computing environment 232 that includes a set of computing resources 234, a server device 240, and a network 250. Devices of environment 200 may interconnect via wired connections, wireless connections, or a combination of wired and wireless connections.

User device 210 includes one or more devices capable of receiving, generating, storing, processing, and/or providing information associated with refilling a cash supply associated with ATM device 220. For example, user device 210 may include a desktop computer, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide, to ATM recommendation platform 230, a response to indicate whether a user of user device 210 wants to provide and/or is capable of providing cash to refill a cash supply associated with ATM device 220, as described elsewhere herein. Additionally, or alternatively, user device 210 may receive, from ATM recommendation platform 230, a notification indicating whether a user of user device 210 has been selected to provide cash to refill a cash supply associated with ATM device 220, as described elsewhere herein. In some implementations, user device 210 may execute an application that facilitates providing a response to and/or receiving a notification from ATM recommendation platform 230, as described elsewhere herein.

ATM device 220 includes one or more devices capable of performing various types of financial transactions, such as a cash withdrawal, a money deposit (e.g., a check or cash deposit), a money transfer (e.g., a transfer from one bank account to another bank account), providing access to information related to an account (e.g., a bank account, a checking account, a credit account, etc.), and/or the like. For example, ATM device 220 may include an ATM, an automated banking machine (ABM), a cash point, a Cashline®, a Minibank®, a cash machine, a Tyme® machine, a cash dispenser, a Bankomat®, a Bancomat®, and/or a similar type of device. In some implementations, ATM device 220 may provide information to ATM recommendation platform 230 to permit ATM recommendation platform 230 to determine whether a cash supply associated with ATM device 220 needs to be refilled, as described elsewhere herein. Additionally, or alternatively, ATM device 220 may receive cash from an individual to refill a cash supply associated with ATM device 220, as described elsewhere herein.

ATM recommendation platform 230 includes one or more devices capable of processing information from ATM device 220 and determining whether a cash supply associated with ATM device 220 needs to be refilled. For example, ATM recommendation platform 230 may include a cloud server or a group of cloud servers. In some implementations, ATM recommendation platform 230 may be designed to be modular such that certain software components can be swapped in or out depending on a particular need. As such, ATM recommendation platform 230 may be easily and/or quickly reconfigured for different uses.

In some implementations, as shown, ATM recommendation platform 230 may be hosted in cloud computing environment 232. Notably, while implementations described herein describe ATM recommendation platform 230 as being hosted in cloud computing environment 232, in some implementations, ATM recommendation platform 230 may not be cloud-based (i.e., may be implemented outside of a cloud computing environment) or may be partially cloud-based.

Cloud computing environment 232 includes an environment that hosts ATM recommendation platform 230. Cloud computing environment 232 may provide computation, software, data access, storage, etc. services that do not require end-user knowledge of a physical location and configuration of system(s) and/or device(s) that host ATM recommendation platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, one or more computing resources 234 may host ATM recommendation platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with ATM recommendation platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Server device 240 includes one or more devices capable of receiving, providing, storing, processing, and/or generating information associated with a cash supply of ATM device 220. For example, server device 240 may include a server (e.g., in a data center or a cloud computing environment), a data center (e.g., a multi-server micro data center), a workstation computer, a virtual machine (VM) provided in a cloud computing environment, or a similar type of device. In some implementations, server device 240 may include a communication interface that allows server device 240 to receive information from and/or transmit information to other devices in environment 200. In some implementations, server device 240 may receive information from ATM recommendation platform 230 (e.g., for storage), as described elsewhere herein. Additionally, or alternatively, server device 240 may provide stored information to ATM recommendation platform 230, as described elsewhere herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
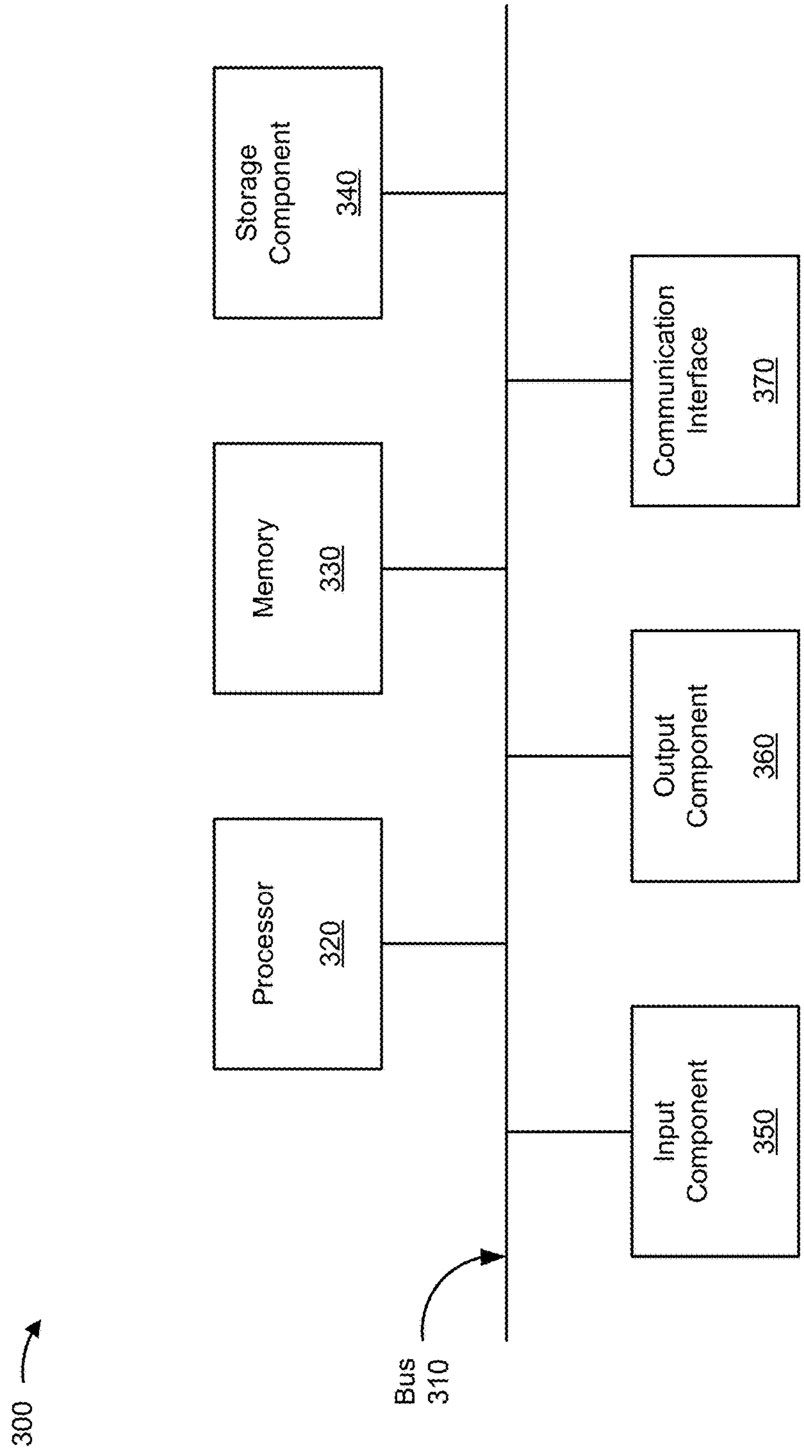
FIG. 3 is a diagram of example components of one or more devices of FIG. 2.

FIG. 3 is a diagram of example components of a device 300. Device 300 may correspond to user device 210, ATM device 220, ATM recommendation platform 230, computing resource 234, and/or server device 240. In some implementations, user device 210, ATM device 220, ATM recommendation platform 230, computing resource 234, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
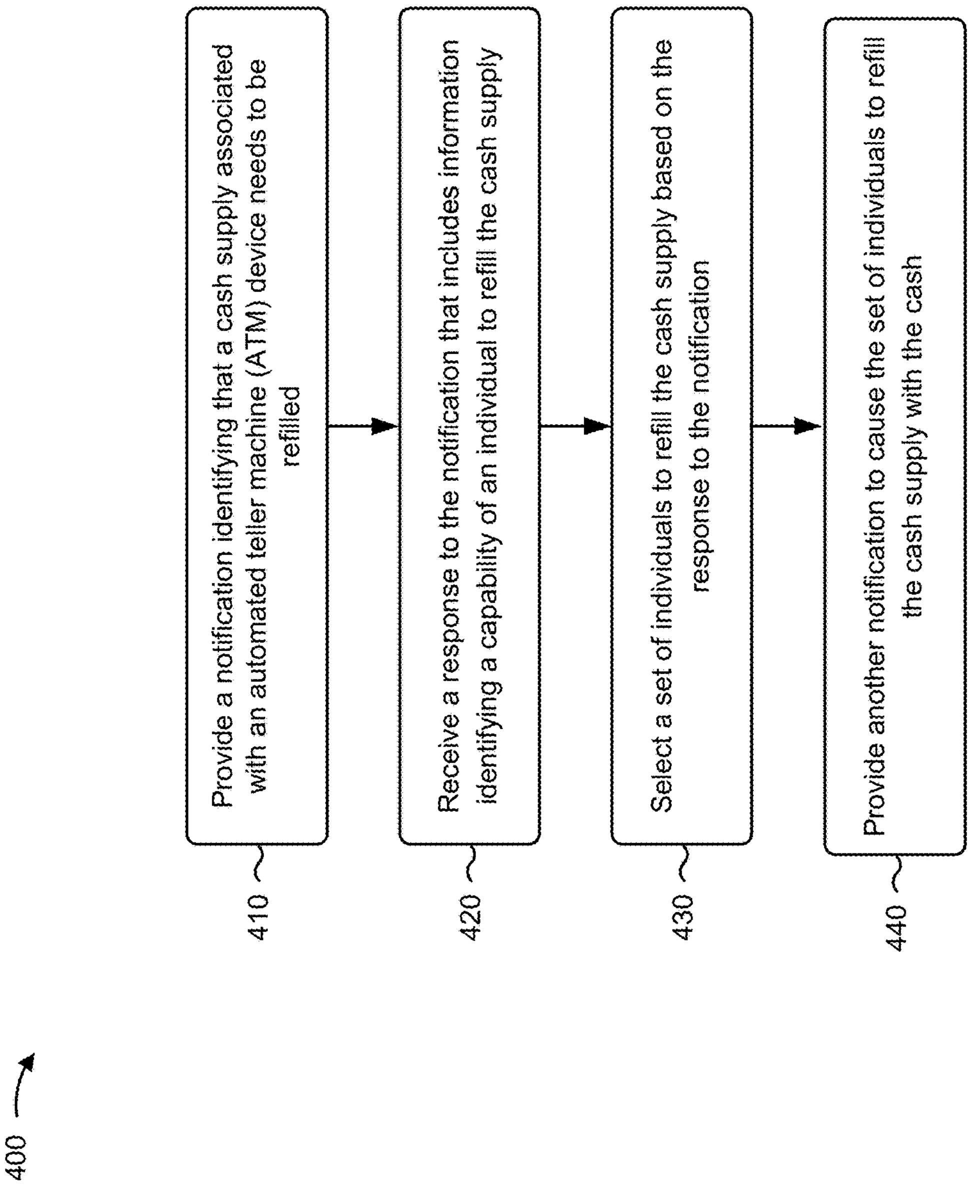
FIG. 4 is a flow chart of an example process for monitoring cash supply-related information and managing refill of a cash supply.

FIG. 4 is a flow chart of an example process 400 for monitoring cash supply-related information and managing refill of a cash supply. In some implementations, one or more process blocks of FIG. 4 may be performed by ATM recommendation platform 230. In some implementations, one or more process blocks of FIG. 4 may be performed by another device or a group of devices separate from or including ATM recommendation platform 230, such as user device 210, ATM device 220, or server device 240.

As shown in FIG. 4, process 400 may include providing a notification identifying that a cash supply associated with an automated teller machine (ATM) device needs to be refilled (block 410). For example, ATM recommendation platform 230 may provide a notification identifying that a cash supply associated with ATM device 220 needs to be refilled. In some implementations, refilling a cash supply may refer to partially refilling and/or fully refilling a cash supply. For example, ATM recommendation platform 230 may determine that a cash supply needs to be partially refilled rather than fully refilled (e.g., because the cash supply is scheduled for a full refill within an amount of time that satisfies a threshold).

In some implementations, ATM recommendation platform 230 may receive information related to a cash supply of ATM device 220 (e.g., from ATM device 220, from a device associated with ATM device 220, etc.). For example, the information may identify an amount of cash in a cash supply, a quantity of various denominations of cash in the cash supply, a demand for cash in the cash supply (e.g., an amount of cash requested in an amount of time, a quantity of various denominations requested in an amount of time, etc.), a capacity of the cash supply (e.g., an amount of cash, a quantity of a denomination of cash, a quantity of bills and/or coins, etc.), and/or the like. In some implementations, ATM recommendation platform 230 may receive information from ATM device 220 in real-time or near real-time.

In some implementations, ATM recommendation platform 230 may receive information from multiple ATM devices 220. For example, ATM recommendation platform 230 may receive, from multiple ATM devices 220, information related to corresponding cash supplies of the multiple ATM devices 220. In some implementations, ATM recommendation platform 230 may receive millions, billions, or more data elements from hundreds, thousands, or more ATM devices 220.

In some implementations, ATM recommendation platform 230 may determine that a cash supply associated with ATM device 220 needs to be refilled. For example, ATM recommendation platform 230 may determine that a cash supply associated with ATM device 220 needs to be refilled based on information received from ATM device 220. In some implementations, ATM recommendation platform 230 may determine, for hundreds, thousands, or more ATM devices 220, that corresponding cash supplies need to be refilled.

In some implementations, ATM recommendation platform 230 may determine that one or more factors associated with a cash supply have been satisfied and may determine that the cash supply needs to be refilled based on the one or more factors having been satisfied. For example, the one or more factors may relate to an amount of cash in a cash supply (e.g., whether the amount of cash satisfies a threshold), a demand for cash in the cash supply (e.g., whether the demand during a period of time satisfies a threshold), a schedule related to refilling the cash supply (e.g., whether the cash supply will be empty prior to cash being provided in association with a scheduled refill), data related to denominations of cash in a cash supply (e.g., whether a quantity of denominations satisfies a threshold, whether a particular combination of denominations are in the cash supply, whether a threshold percentage of cash is in a particular denomination, etc.) and/or the like.

In some implementations, ATM recommendation platform 230 may determine a prediction related to a demand for the cash in the cash supply. For example, ATM recommendation platform 230 may determine a prediction related to a demand for cash based on a demand for the cash for a period of time prior to determining the prediction, based on historical demand for the cash (e.g., for a particular ATM device 220 or across multiple ATM devices 220), based on one or more factors related to the cash supply and/or ATM device 220 (e.g., a location of ATM device 220, a time of day or day of the week, a capacity of the cash supply, etc.), and/or the like. In some implementations, ATM recommendation platform 230 may determine that a cash supply needs to be refilled based on the prediction related to the demand for cash (e.g., based on the predicted demand satisfying a threshold, based on the prediction indicating that the cash supply will be empty or low prior to a particular time or a scheduled refill, based on the prediction indicating that a certain denomination of cash in the cash supply will be exhausted or low prior to a particular time or a scheduled refill, etc.).

In some implementations, ATM recommendation platform 230 may determine a score for a cash supply. For example, the score may indicate a likelihood that an amount of cash in a cash supply will last an amount of time that satisfies a threshold, a severity of a depletion of an amount of cash in a cash supply, a confidence that a cash supply needs to be refilled (e.g., based on an amount of cash in the cash supply, a predicted demand for the cash, a location of ATM device 220, etc.), and/or the like.

In some implementations, ATM recommendation platform 230 may determine a score based on information related to a cash supply satisfying one or more factors. For example, ATM recommendation platform 230 may determine a score for a cash supply based on information related to the cash supply indicating that an amount of cash in the cash supply satisfies a threshold, that demand for cash in the cash supply satisfies a threshold, that ATM device 220 is in a particular location, and/or the like. In some implementations, the score may be a weighted score, where different factors and/or different thresholds for each factor are weighted differently, an average score, where scores for different factors and/or thresholds are averaged, and/or the like.

In some implementations, ATM recommendation platform 230 may use machine learning, artificial intelligence, and/or the like to determine a score for a cash supply and/or to determine whether a cash supply needs to be refilled. For example, ATM recommendation platform 230 may use machine learning, artificial intelligence, and/or the like to determine whether information related to ATM device 220 and/or a cash supply of ATM device 220 is similar to training data and may determine a score based on a result of determining whether the information is similar to the training data. In some implementations, ATM recommendation platform 230 may generate a model related to information related to ATM devices 220 and/or cash supplies (e.g., where the model was trained on information related to ATM devices 220 and/or cash supplies and information identifying whether ATM devices 220 and/or the cash supplies needed to be refilled). In some implementations, ATM recommendation platform 230 may use the model to determine whether a particular ATM device 220 and/or a cash supply needs to refilled (e.g., the model may output a score that indicates a confidence that ATM device 220 and/or the cash supply needs to be refilled).

In some implementations, a model that ATM recommendation platform 230 generates may be generic to multiple ATM devices 220 and/or specific to a particular ATM device 220. For example, a model that is generic to multiple ATM devices 220 may be generated based on information related to multiple ATM devices 220 (e.g., multiple ATM devices 220 that have varying demand, varying locations, etc.). Additionally, or alternatively, and as another example, a model that is specific to a particular ATM device 220 may be generated based on information related to that particular ATM device 220 (e.g., based on variations in demand for that particular ATM device 220).

In this way, ATM recommendation platform 230 may use one or more techniques to determine information from complicated and/or imprecise data. In addition, in this way, ATM recommendation platform 230 may process noisy or incomplete data, thereby improving processing of data. This permits ATM recommendation platform 230 to extract patterns and/or detect trends in data that cannot be extracted or detected by a human. In addition, this permits ATM recommendation platform 230 to process data when algorithmic methods of processing the data would consume significant processing resources of ATM recommendation platform 230.

In some implementations, ATM recommendation platform 230 may provide, to user device 210, a notification related to refilling the cash supply (e.g., after determining that the cash supply needs to be refilled). In some implementations, a notification may include information related to a need for a cash supply to be refilled. For example, the notification may include information identifying a need for a cash supply to be refilled, an amount of cash that is needed to refill the cash supply to a level that satisfies a threshold, denominations and/or a quantity of each denomination that the cash supply needs, a period of time during which the cash supply needs to be refilled, and/or the like.

Additionally, or alternatively, a notification may include information related to one or more incentives related to a need for a cash supply to be refilled. For example, a notification may identify one or more incentives related to a need for a cash supply to be refilled, an expiration date and/or time for an incentive, different tiers of incentives (e.g., different tiers for different combinations of amounts and/or denominations of cash), and/or the like. In some implementations, an incentive may include an amount of money that is credited to an account associated with an individual that provides cash to refill a cash supply, a discount to be applied to a future fee for a service provided to an individual that provides cash to refill a cash supply, reward points credited to an account associated with an individual that provides cash to refill a cash supply, and/or the like.

In some implementations, ATM recommendation platform 230 may determine to restrict an amount of cash that ATM device 220 provides from a cash supply. For example, ATM recommendation platform 230 may determine to restrict an amount of cash that ATM device 220 provides from a cash supply associated with ATM device 220 based on an amount of cash in the cash supply satisfying a threshold, a demand for the amount of cash in the cash supply satisfying a threshold, and/or the like. In some implementations, ATM recommendation platform 230 may provide a set of instructions to ATM device 220 to cause ATM device 220 to restrict an amount of cash (or denominations of cash) provided from a cash supply associated with ATM device 220.

In some implementations, ATM recommendation platform 230 may receive data from user device 210. For example, the data may identify that a distance between user device 210 and ATM device 220 satisfies a threshold. Continuing with the previous example, an application stored on user device 210 may communicate with ATM recommendation platform 230 to receive information related to locations of ATM devices 220 and may use this information to determine whether a distance between user device 210 and one or more of the ATM devices 220 satisfies a threshold (e.g., using information that identifies a location of user device 210). In some implementations, ATM recommendation platform 230 may provide a notification to user device 210 after receiving data from user device 210 indicating that a distance between user device 210 and ATM device 220 satisfies a threshold.

Additionally, or alternatively, ATM recommendation platform 230, rather than user device 210, may determine whether a distance between user device 210 and ATM device 220 satisfies a threshold. In some implementations, ATM recommendation platform 230 may provide a notification to user device 210 after determining that a distance between user device 210 and ATM device 220 satisfies a threshold.

In some implementations, ATM recommendation platform 230 may receive data identifying that an electronic wallet associated with user device 210 is storing cash (e.g., an amount of cash that satisfies a threshold, a quantity of bills that satisfies a threshold, etc.). For example, an electronic wallet connected to user device 210 may detect that the electronic wallet is storing cash, and user device 210 may provide data to ATM recommendation platform 230 after receiving an indication from the electronic wallet that the electronic wallet is storing cash. In some implementations, and continuing with the previous example, user device 210 may request, from the electronic wallet, information related to cash stored in the electronic wallet based on determining that a distance between user device 210 and ATM device 220 satisfies a threshold. In some implementations, ATM recommendation platform 230 may provide a notification to user device 210 after receiving, from user device 210, information identifying that an electronic wallet associated with user device 210 is storing cash.

In this way, ATM recommendation platform 230 may provide a notification identifying that a cash supply associated with ATM device 220 needs to be refilled.

As further shown in FIG. 4, process 400 may include receiving a response to the notification that includes information identifying a capability of an individual to refill the cash supply (block 420). For example, ATM recommendation platform 230 may receive a response to the notification that includes information identifying a capability of an individual to refill the cash supply. In some implementations, ATM recommendation platform 230 may receive dozens, hundreds, thousands, or more of notifications from dozens, hundreds, thousands, or more user devices 210.

In some implementations, a response from user device 210 may include information identifying a capability of an individual, associated with user device 210, to provide cash to refill a cash supply. For example, a response may identify an amount of cash that the individual can provide to refill a cash supply, a quantity and/or combination of different denominations of cash that an individual can provide to refill a cash supply, a time at which, or a period of time during which, an individual can provide cash to refill a cash supply, and/or the like.

Additionally, or alternatively, a response may include information related to an individual, user device 210 associated with the individual, an account associated with the individual and/or user device 210, and/or the like. For example, a response may include information identifying an individual, user device 210, and/or an account. Additionally, or alternatively, and as another example, a response may identify whether an account associated with an individual is a preferred account (e.g., an account associated with a level of service that satisfies a threshold, an account that has been open for a threshold amount of time, etc.). Additionally, or alternatively, and as another example, a response may identify a location of user device 210 and/or an individual associated with user device 210.

In some implementations, ATM recommendation platform 230 may receive a response when a user of user device 210 provides input to user device 210 to cause user device 210 to provide a response to ATM recommendation platform 230. For example, a user of user device 210 may execute an application on user device 210 and may cause user device 210 to provide a response to ATM recommendation platform 230 via the application. In some implementations, an application executed via user device 210 may provide a user interface associated with ATM recommendation platform 230. Additionally, or alternatively, a notification may include information identifying that a user of user device 210 does not want to, or cannot, provide cash to refill a cash supply.

Additionally, or alternatively, ATM recommendation platform 230 may receive a response based on expiration of a timer. For example, when user device 210 receives a notification from ATM recommendation platform 230, user device 210 may initiate a timer that provides a period of time for a user of user device 210 to cause user device 210 to provide a response to the notification. Continuing with the previous example, user device 210 may provide a response to ATM recommendation platform 230 when a timer expires without user device 210 receiving input from a user of user device 210. Similarly, in some implementations, ATM recommendation platform 230 may initiate a similar timer and may determine whether a response is received prior to expiration of the timer (e.g., where no response prior to expiration of the timer may indicate that a user of user device 210 does not want to, or cannot, provide cash to refill a cash supply).

In some implementations, ATM recommendation platform 230 may process a response from user device 210. For example, ATM recommendation platform 230 may process a response to identify a capability of an individual to provide cash to refill the cash supply. Continuing with the previous example, ATM recommendation platform 230 may process a response to identify an amount of cash an individual can provide, denominations of cash that an individual can provide, a time at which, or a period of time during which, an individual can provide cash to refill a cash supply, and/or the like.

In this way, ATM recommendation platform 230 may receive a response to the notification that includes information identifying a capability of an individual to refill the cash supply.

As further shown in FIG. 4, process 400 may include selecting a set of individuals to refill the cash supply based on the response to the notification (block 430). For example, ATM recommendation platform 230 may select a set of individuals to refill the cash supply based on the response to the notification. In some implementations, ATM recommendation platform 230 may include an individual in a set of individuals when a response from user device 210 associated with the individual identifies that the individual can provide cash to refill a cash supply.

In some implementations, ATM recommendation platform 230 may determine whether one or more factors associated an individual have been satisfied based on a response from user device 210 with which the individual is associated. For example, ATM recommendation platform 230 may determine whether an individual can provide an amount of cash that satisfies a threshold, whether an individual can provide a particular combination of denominations of cash, whether an individual can provide cash at a particular time, or during a period of time, and/or the like. In some implementations, ATM recommendation platform 230 may select an individual based on whether one or more factors have been satisfied.

In some implementations, ATM recommendation platform 230 may determine a score for an individual, in a manner similar to that described elsewhere herein. For example, ATM recommendation platform 230 may determine a score that indicates a degree to which one or more factors associated with an individual are satisfied, a combination and/or quantity of factors that are satisfied, and/or the like. In some implementations, ATM recommendation platform 230 may select an individual that has a threshold score, that has the highest score relative to another individual, and/or the like.

In some implementations, ATM recommendation platform 230 may select multiple sets of individuals. For example, ATM recommendation platform 230 may select a first set of individuals to refill a first cash supply associated with a first ATM device 220 and may select a second set of individuals to refill a second cash supply associated with a second ATM device 220. In some implementations, ATM recommendation platform 230 may select dozens, hundreds, thousands, or more sets of individuals to refill corresponding ATM devices 220 (e.g., in real-time or near real-time). In this way, ATM recommendation platform 230 may efficiently and automatically manage refill of cash supplies for a large quantity of ATM devices 220 (e.g., a quantity that satisfies a threshold).

In this way, ATM recommendation platform 230 may select a set of individuals to refill the cash supply based on the response to the notification.

As further shown in FIG. 4, process 400 may include providing another notification to cause the set of individuals to refill the cash supply with the cash (block 440). For example, ATM recommendation platform 230 may provide another notification to cause the set of individuals to refill the cash supply with the cash.

In some implementations, another notification provided to user device 210 may indicate whether an individual associated with user device 210 has been selected to refill a cash supply. For example, another notification may notify an individual whether the individual has been selected to refill the cash supply and, when the individual has been selected, may provide additional information concerning refilling the cash supply.

In some implementations, ATM recommendation platform 230 may determine a schedule for an individual to refill a cash supply with cash. For example, ATM recommendation platform 230 may use an electronic calendar on user device 210 associated with a selected individual to identify a time for an individual to deposit cash. In some implementations, ATM recommendation platform 230 may schedule multiple individuals to provide cash to ATM device 220 (e.g., may coordinate when the multiple individuals are to provide cash to ATM device 220, such as to avoid disrupting normal operations of ATM device 220, to avoid having multiple people arrive at ATM device 220 to provide cash at the same time, etc.). In some implementations, ATM recommendation platform 230 may include information identifying a schedule for providing cash in another notification provided to user device 210.

In some implementations, ATM recommendation platform 230 may schedule a cash supply to be refilled. For example, ATM recommendation platform 230 may provide, to server device 240 associated with an organization that refills cash supplies, a message to schedule a cash supply to be refilled by the organization. In some implementations, ATM recommendation platform 230 may schedule a cash supply to be refilled based on responses received from user devices 210. For example, ATM recommendation platform 230 may schedule a cash supply to be refilled based on whether responses from user devices 210 indicate that individuals can provide a threshold amount of cash to refill a cash supply, a threshold quantity of various denominations, and/or the like.

In some implementations, ATM recommendation platform 230 may determine a set of directions to ATM device 220 and may provide the set of directions to user device 210 for display. Additionally, or alternatively, ATM recommendation platform 230 may cause a navigational application on user device 210 to open and/or determine a set of directions to ATM device 220 (e.g., based on automatically populating the navigational application with information identifying a location of ATM device 220).

In some implementations, ATM device 220 may receive cash from and individual and may sort the cash by denomination after receiving the cash. For example, ATM device 220 may use a cash recycler to sort unsorted cash received from an individual. Additionally, or alternatively, ATM device 220 may receive sorted cash from an individual (e.g., sorted by denomination).

In some implementations, ATM recommendation platform 230 may receive information identifying that ATM device 220 has received cash from an individual after providing another notification. In some implementations, ATM recommendation platform 230 may monitor, from ATM device 220, information related to a cash supply, such as information identifying an amount of cash in the cash supply, a demand for cash in the cash supply, and/or the like. In this way, ATM recommendation platform 230 may monitor a cash supply to determine whether a cash supply needs to be refilled again.

In some implementations, ATM recommendation platform 230 may update an account associated with an individual based on an amount of cash provided by the individual and/or one or more incentives associated with providing cash. For example, ATM recommendation platform 230 may update information identifying an amount of money in an account, a discount for a fee credited to an account, reward points associated with an account, and/or the like.

In some implementations, ATM recommendation platform 230 may generate a report related to a cash supply after providing another notification to user device 210. For example, the report may identify an amount of cash in a cash supply, an amount of cash provided by a set of individuals to ATM device 220, one or more incentives applied to an account associated with an individual that provided cash to ATM device 220, and/or the like.

In some implementations, ATM recommendation platform 230 may provide, to ATM device 220, a set of instructions to permit ATM device 220 to provide cash to an individual after an individual has provided the cash to refill a cash supply. For example, ATM recommendation platform 230 may determine that an amount of cash provided to ATM device 220 satisfies a threshold and may provide a set of instructions to permit ATM device 220 to provide the cash based on the amount of cash satisfying the threshold.

In some implementations, ATM recommendation platform 230 may determine to restrict an amount of cash (or denominations of cash) that ATM device 220 provides from a cash supply. For example, ATM recommendation platform 230 may determine to restrict an amount of cash from ATM device 220 based on an amount of cash received from an individual (e.g., an amount of cash satisfying a threshold) and a set of instructions provided to ATM device 220 may restrict the amount of cash that ATM device 220 provides. Similarly, in some implementations, a set of instructions may restrict a rate at which cash can be provided, may cap an amount of cash that can be provided during a period of time, and/or the like.

In this way, ATM recommendation platform 230 may provide another notification to cause the set of individuals to refill the cash supply with the cash.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
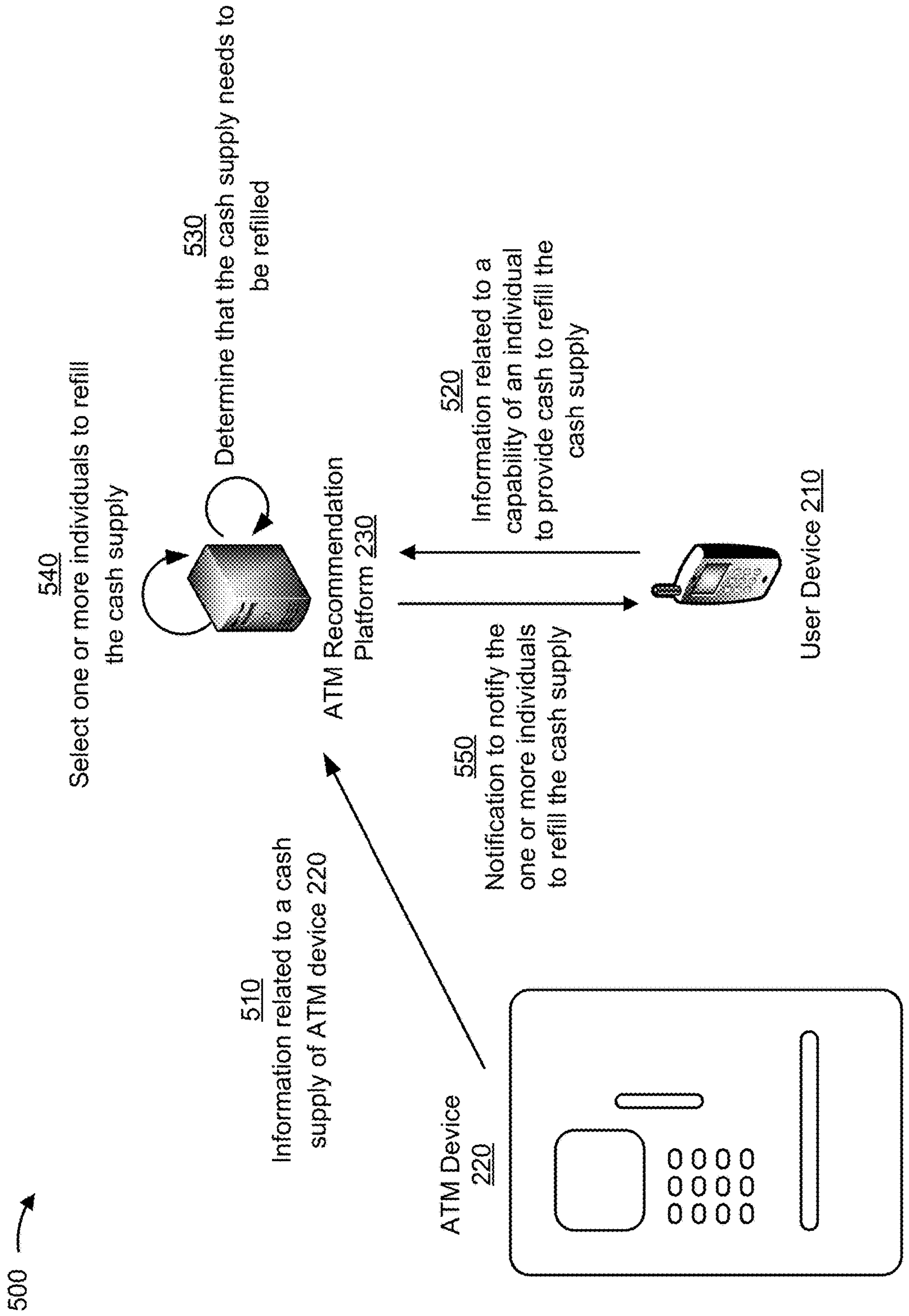
FIG. 5 is a diagram of an example implementation relating to the example process shown in FIG. 4.

FIG. 5 is a diagram of an example implementation 500 related to process 400 shown in FIG. 4.

As shown in FIG. 5, and by reference number 510, ATM recommendation platform 230 may receive information related to a cash supply of ATM device 220. As shown by reference number 520, user device 210 may provide information related to a capability of an individual to provide cash to refill the cash supply. For example, user device 210 may provide the information in real-time or near real-time.

In some implementations, user device 210 may monitor cash stored in an electronic wallet associated with user device 210 and may provide information related to a capability of an individual to provide cash when user device 210 detects that the electronic wallet is storing cash, that an amount of cash stored in the electronic wallet satisfies a threshold, and/or the like. Additionally, or alternatively, user device 210 may provide information related to a capability of an individual to provide cash when a distance between user device 210 and ATM device 220 satisfies a threshold (e.g., using information identifying a location of ATM device 220 and information identifying a location of user device 210). For example, user device 210 may monitor a location of user device 210 and may compare information identifying a location of user device 210 and information identifying locations of ATM devices 220 to determine when a distance between user device 210 and any of ATM devices 220 satisfies a threshold.

In some implementations, user device 210 may provide information to ATM recommendation platform 230 in a streaming manner. For example, user device 210 may provide information to ATM recommendation platform 230 continuously, in real-time or near real-time, and/or the like.

As shown by reference number 530, ATM recommendation platform 230 may determine that the cash supply needs to be refilled. As shown by reference number 540, ATM recommendation platform 230 may select one or more individuals to refill the cash supply. As shown by reference number 550, ATM recommendation platform 230 may provide, to user device 210, a notification to notify the one or more individuals to refill the cash supply.

As indicated above, FIG. 5 is provided merely as an example. Other examples are possible and may differ from what was described with regard to FIG. 5.

In this way, ATM recommendation platform 230 may process information related to a cash supply of ATM device 220 and/or may select one or more individuals to refill the cash supply. This improves operations of ATM device 220 by reducing or eliminating situations when ATM device 220 runs out of cash. In addition, this provides an individual with a way to securely store excess cash when the user does not need the excess cash and ATM device 220 needs the cash. Further, this conserves computing resources of ATM device 220 that would otherwise be consumed when a user attempts to use ATM device 220 to obtain cash when a cash supply associated with ATM device 220 does not have cash. Further, this permits a cash supply associated with ATM device 220 to be flexibly refilled based on varying demand for cash in the cash supply, thereby improving management of refilling of the cash supply.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
determine that a cash supply associated with an automated teller machine (ATM) device needs to be refilled;
provide, to a plurality of user devices, a notification related to refilling the cash supply,
the notification identifying a need for the cash supply to be refilled,
the notification including information related to the need for the cash supply to be refilled,
the notification including information identifying one or more incentives related to the need for the cash supply to be refilled;
receive, from each of one or more user devices of the plurality of user devices, a response to the notification,
the response, from a user device of the one or more user devices, including information identifying a capability of an individual, associated with the user device, to provide cash to refill the cash supply,
the response including information related to at least one of:
the individual,
the user device, or
an account associated with the individual;
select, based on the response from each of the one or more user devices, at least one individual to refill the cash supply with the cash; and
provide, to each of the one or more user devices, another notification related to refilling the cash supply,
the other notification, for the user device, indicating whether the individual has been selected to refill the cash supply.

2. The device of claim 1, where the one or more processors are further to:
determine that one or more factors associated with the cash supply have been satisfied; and
where the one or more processors, when determining that the cash supply needs to be refilled, are to:
determine that the cash supply needs to be refilled based on the one or more factors having been satisfied.

3. The device of claim 1, where the one or more processors are further to:
determine that one or more factors associated with the at least one individual have been satisfied based on the response from each of the one or more user devices; and
where the one or more processors, when selecting the at least one individual, are to:
select the at least one individual based on the one or more factors having been satisfied.

4. The device of claim 1, where the one or more processors are further to:
determine a schedule for the at least one individual to refill the cash supply with the cash; and
where the one or more processors, when providing the other notification, are to:
provide the other notification after determining the schedule,
the other notification including information identifying the schedule.

5. The device of claim 1, where the one or more processors are further to:
send, to a server device associated with an organization that refills cash supplies for ATM devices, a message to schedule the cash supply to be refilled by the organization based on the response from each of the one or more user devices.

6. The device of claim 1, where the one or more processors are further to:
receive information identifying that the ATM device has received the cash from the at least one individual after providing the other notification; and
monitor, from the ATM device, information related to the cash supply,
the information related to the cash supply identifying at least one of:
an amount of cash in the cash supply, or
a demand for the cash in the cash supply.

7. The device of claim 1, where the one or more processors are further to:

update the account associated with the individual based on an amount of cash provided by the individual or the one or more incentives.

8. A non-transitory computer-readable medium storing instructions, the instructions comprising:

one or more instructions that, when executed by one or more processors, cause the one or more processors to:

determine that a cash supply associated with an automated teller machine (ATM) device needs to be refilled;

provide, to a plurality of user devices, a notification requesting cash to refill the cash supply, the notification including information related to a need for the cash supply to be refilled;

receive, from each of one or more user devices of the plurality of user devices, a response to the notification, the response, from a user device of the one or more user devices, including information identifying a capability of an individual, associated with the user device, to:

provide an amount of cash to refill the cash supply, provide the cash during a time period, or provide particular denominations of cash;

select, based on the response from each of the one or more user devices, at least one individual to refill the cash supply with the cash; and provide, to each of the one or more user devices, another notification related to refilling the cash supply, the other notification, for the user device, being related to notifying the individual whether the individual has been selected to refill the cash supply.

9. The non-transitory computer-readable medium of claim 8, where the one or more instructions, when executed by the one or more processors, further cause the one or more processors to:

determine a prediction related to a demand for the cash in the cash supply; and where the one or more instructions, that cause the one or more processors to determine that the cash supply needs to be refilled, cause the one or more processors to:

determine that the cash supply needs to be refilled based on the prediction related to the demand.

10. The non-transitory computer-readable medium of claim 8, where the one or more instructions, when executed by the one or more processors, further cause the one or more processors to:

generate a report related to the cash supply after providing the other notification to each of the one or more user devices.

11. The non-transitory computer-readable medium of claim 8, where the one or more instructions, when executed by the one or more processors, further cause the one or more processors to:

receive, from the plurality of user devices, a plurality of messages, a message, of the plurality of messages and associated with the user device, identifying that:

a distance between the user device and the ATM device satisfies a threshold, or an electronic wallet associated with the user device is storing the amount of cash, the amount of cash satisfying a threshold; and where the one or more instructions, that cause the one or more processors to provide the notification to the plurality of user devices, cause the one or more processors to:

provide the notification to the plurality of user devices after receiving the plurality of messages.

12. The non-transitory computer-readable medium of claim 8, where the one or more instructions, when executed by the one or more processors, further cause the one or more processors to:

provide, to the ATM device, a set of instructions to permit the ATM device to provide the cash to one or more other individuals after the at least one individual has provided the cash to refill the cash supply.

13. The non-transitory computer-readable medium of claim 8, where the one or more instructions, when executed by the one or more processors, further cause the one or more processors to:

determine that the cash provided by the at least one individual satisfies a threshold; and determine to schedule the cash supply to be refilled by an organization associated with refilling cash supplies for ATM devices based on determining that the cash provided by the at least one individual satisfies the threshold.

14. The non-transitory computer-readable medium of claim 8, where the one or more instructions, that cause the one or more processors to select the at least one individual, cause the one or more processors to:

select the at least one individual based on one or more factors, associated with the at least one individual, being satisfied.

15. A method, comprising:

determining, by a device, that a cash supply associated with an automated teller machine (ATM) device needs to be refilled;

providing, by the device and to a plurality of user devices, a notification related to refilling the cash supply, the notification identifying a need for the cash supply to be refilled, the notification including information identifying one or more incentives related to the need for the cash supply to be refilled;

receiving, by the device and from each of one or more user devices of the plurality of user devices, a response to the notification, the response, from a user device of the one or more user devices, including information identifying a capability of an individual to provide cash to refill the cash supply, the individual being associated with the user device;

processing, by the device, the response from the user device to identify the capability of the individual to provide the cash to refill the cash supply;

selecting, by the device and based on the response from the user device, the individual to refill the cash supply with the cash; and providing, by the device and to the user device, another notification related to refilling the cash supply, the other notification, for the user device, indicating that the individual has been selected to refill the cash supply.

16. The method of claim 15, further comprising:
determining that the individual can provide an amount of cash, to refill the cash supply, that satisfies a threshold; and
where selecting the individual comprises:
selecting the individual after determining that the individual can provide the amount of cash that satisfies the threshold.

17. The method of claim 15, further comprising:
determining a predicted demand related to the cash supply based on one or more factors; and
where determining that the cash supply needs to be refilled comprises:
determining that the cash supply needs to be refilled based on the predicted demand related to the cash supply.

18. The method of claim 15, where the notification, which identifies the need for the cash supply to be refilled, includes:
a need for a threshold an amount of cash,
a need for particular denominations of cash, or
a need for the cash to be provided during a period of time.

19. The method of claim 15, further comprising:
determining to restrict an amount of cash that the ATM device provides from the cash supply based on at least one of:
an amount of cash in the cash supply,
the response from each of the one or more user devices, or
an amount of cash received from the individual; and
providing a set of instructions to the ATM device to restrict the amount of cash that the ATM device provides from the cash supply after determining to restrict the amount of cash that the ATM device provides.

20. The method of claim 15, where the notification includes information identifying an expiration time or date for the one or more incentives.

* * * * *